(12) United States Patent  (10) Patent No.: US 7,395,609 B2
Powell                     (45) Date of Patent:     Jul. 8, 2008

(54) 3-DIMENSIONAL CABLE GUIDE AND CABLE BASED POSITION TRANSDUCER

(75) Inventor: Bradley J. Powell, Palmdale, CA (US)

(73) Assignee: SpaceAge Control, Inc., Palmdale, CA (US)

( * ) Notice: Subject to any disclaimer, the term of this patent is extended or adjusted under 35 U.S.C. 154(b) by 158 days.

(21) Appl. No.: 11/535,093

(22) Filed: Sep. 26, 2006

(65) Prior Publication Data
US 2008/0072443 A1    Mar. 27, 2008

(51) Int. Cl.
G01C 15/02  (2006.01)
G01B 5/02   (2006.01)

(52) U.S. Cl. .............................. 33/763; 33/1 N; 33/756; 33/761

(58) Field of Classification Search .................. 33/1 M, 33/1 N, 1 PT, 503, 504, 534, 733, 756, 759, 33/760, 761, 762, 763; 254/334, 335, 336, 254/338; 242/397, 397.1, 397.2, 397.5
See application file for complete search history.

(56) References Cited

U.S. PATENT DOCUMENTS

| 2,284,532 | A | * | 5/1942 | Napier | 254/335 |
| 2,725,853 | A | * | 12/1955 | Nordheim | 119/789 |
| 3,271,564 | A |   | 9/1966 | Rosenfeld et al. | |
| 3,564,533 | A | * | 2/1971 | Linn | 341/5 |
| 3,780,440 | A |   | 12/1973 | Taylor | |
| 3,812,589 | A | * | 5/1974 | Schultheis | 33/756 |
| 3,832,781 | A |   | 9/1974 | Flagge | |
| 4,205,453 | A | * | 6/1980 | Steele | 33/534 |
| 4,500,749 | A | * | 2/1985 | Khoshnevis | 178/19.01 |
| 4,575,944 | A |   | 3/1986 | Lin | |
| 4,583,700 | A | * | 4/1986 | Tschurbanoff | 242/390.5 |
| 5,001,658 | A |   | 3/1991 | Walters | |
| 5,004,870 | A | * | 4/1991 | Osborn | 178/18.01 |

(Continued)

FOREIGN PATENT DOCUMENTS

JP          05148858 A  *  6/1993

(Continued)

OTHER PUBLICATIONS

Prodim Corp., Publisher: Prodim International BV, Author: not stated Title: The Proliner. Date: not known, possibly 2003, Place: http://www.prodim.nl/the-proliner 13.html (Continued)

*Primary Examiner*—R. A. Smith
(74) *Attorney, Agent, or Firm*—John V. Stewart

(57) ABSTRACT

A pivoting cable extension arm (2) has a pivot sensor (3). The extension arm is mounted on a swivel frame (4) having a swivel sensor (5). The swivel frame has two tangent sheaves (4A, 4C) that allow a wide pivot range of the extension arm. A cable take-up drum (6) has a range sensor (7) for sensing the length of cable (1) extending from the drum. The three-sensors (3, 5, 7) provide data for computing 3D coordinates of the end of the cable (1) over a wide range of space surrounding the assembly. This allows an object to be measured and modeled in three dimensions by touching the cable end to points on the object and acquiring spatial coordinates of the points.

3 Claims, 2 Drawing Sheets

U.S. PATENT DOCUMENTS

| | | | |
|---|---|---|---|
| 5,035,064 A | 7/1991 | Care | |
| 5,248,960 A | 9/1993 | Hamma | |
| 5,761,822 A | 6/1998 | Steinich | |
| 6,561,451 B1 | 5/2003 | Steinich | |
| 6,609,309 B2 | 8/2003 | Shibuya | |
| 6,658,755 B2 | 12/2003 | Arlinsky | |
| 6,754,974 B2 * | 6/2004 | Bassolino et al. | 33/759 |
| 6,768,321 B2 * | 7/2004 | Wain et al. | 324/699 |
| 6,785,973 B1 | 9/2004 | Janssen | |
| 6,868,620 B2 | 3/2005 | Sanoner | |
| 7,118,094 B2 * | 10/2006 | McDaniel et al. | 254/335 |

FOREIGN PATENT DOCUMENTS

| | | | |
|---|---|---|---|
| JP | 09089506 A | * | 4/1997 |
| JP | 2000314626 A | * | 11/2000 |
| JP | 2001004375 A | * | 1/2001 |

OTHER PUBLICATIONS

JK Controls, Publisher: JK Controls, Author: not stated Title: 3 Dimensional Displacement Transducer Date: Oct. 3, 2003, Place: http://fp.jkcontrols.plus.com/3DPT.HTM.

Spaceage Control, Publisher: NASA, Author: S. Ockerman, Title: Position Angle Indicator, pp. 1-6 Date: Mar. 10, 1987, Place NASA Ames-Dryden Flight Research Facility, CA.

* cited by examiner

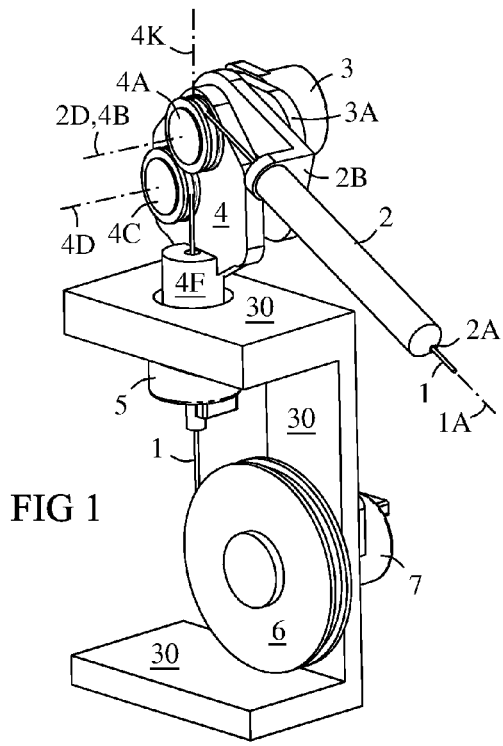
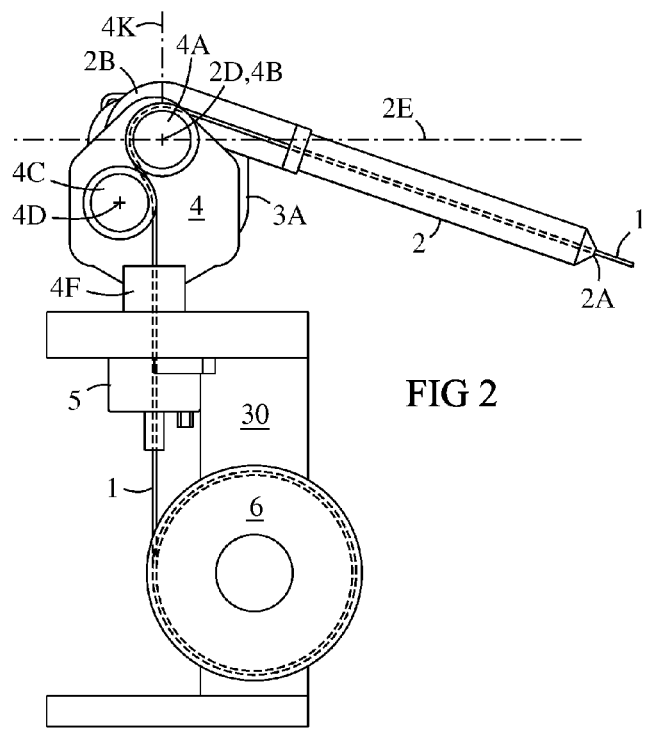
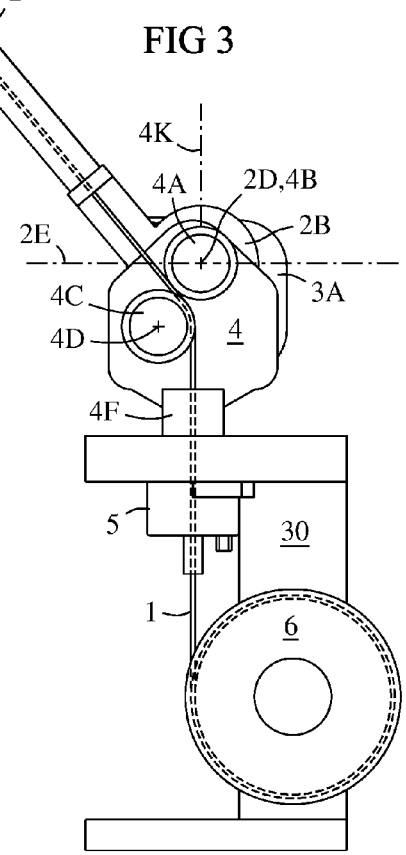
FIG 1
FIG 2
FIG 3

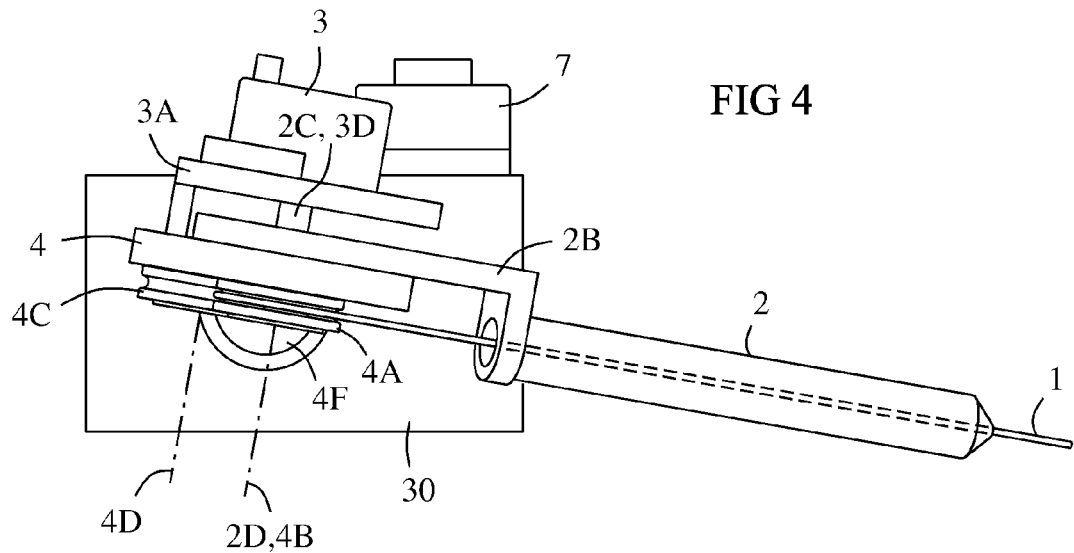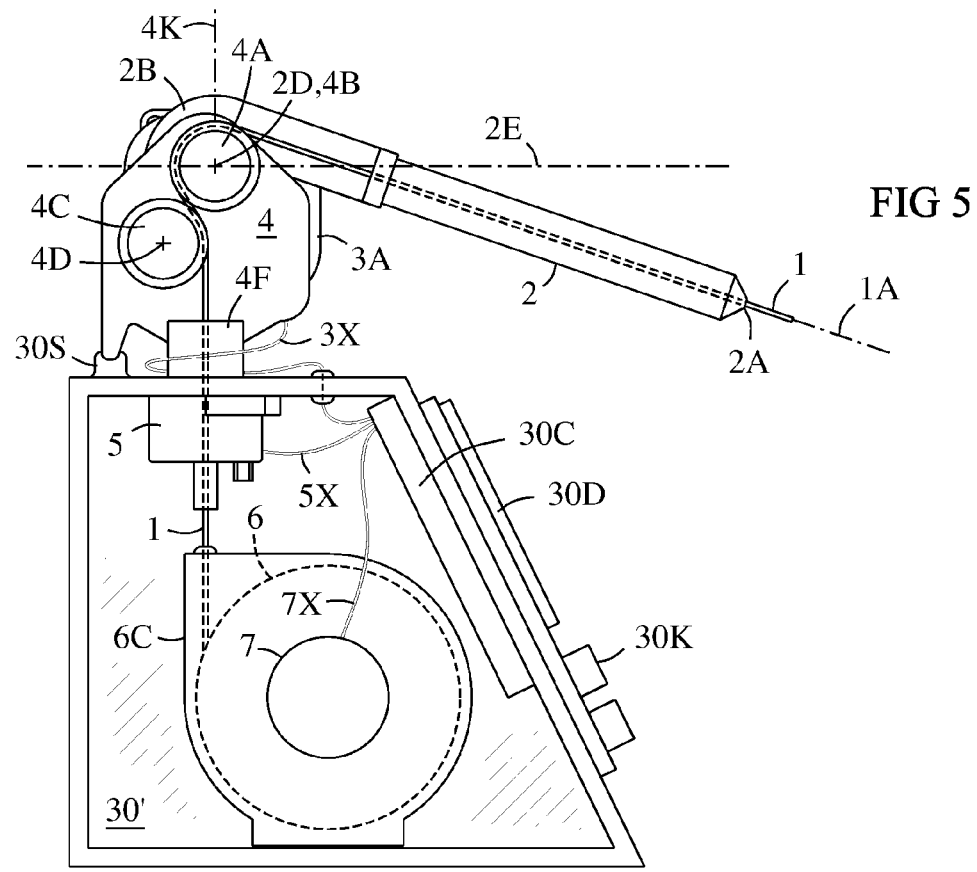

3-DIMENSIONAL CABLE GUIDE AND CABLE BASED POSITION TRANSDUCER

BACKGROUND OF THE INVENTION

1. Field of the Invention

This invention relates to transducers that sense the extension/retraction and angular orientation of a cable to determine the position, in spatial coordinates, of the end of the cable, thus enabling the measurement of points on an object in 3-dimensional space.

2. Description of Prior Art

Prior devices sense the extension and direction of a cable pulled from a drum through a directional arm to provide positional sensing and measurement of objects in 3 dimensions. The positional measuring point of such devices is at the end of an extendable arm or at the end of a cable that passes through a pivoting arm. In either case, the arm may pivot about a horizontal axis (pitch) and about a vertical axis (yaw). However, the prior devices have limited arm pivot range and/or excessive friction. One example is a 3 dimensional displacement transducer of JK Controls Limited, which mounts a linear transducer and an extendable arm onto a twice gimbaled mounting with angular measurements at each fulcrum. As another example, U.S. Pat. No. 6,785,973 shows a 3-D measuring probe with a directional cable guide arm that pivots about a point on a ball in a socket. A sensor or sensors in the ball joint sense the position of the ball in two degrees of freedom (pitch and yaw). A product related to that of U.S. Pat. No. 6,785,973 found on the market does not use a ball joint, but uses a single pulley wheel. However, using a single wheel limits the range of pitch of the arm.

SUMMARY OF THE INVENTION

The objective of this invention is to provide a system that accurately measures an extension distance and direction of an end of a cable pulled from a drum over a wide range of directions with minimum friction. These objectives are achieved in a 3-dimensional (3D) position transducer using a cable that passes through a pivoting arm, in which the 3D position of the end of the cable is determined using three sensors on respective parts of a mechanism with three axes of motion. The mechanism and sensors are capable of measuring 3D coordinates at the cable endpoint using a polar coordinate system, which is convertible to Cartesian coordinates as needed. The invention supports a wider range of motion and lower friction than prior devices by means of a directional cable extension arm pivotally mounted on a swivel frame with dual sheaves that provide minimum friction and maximum accuracy over a wide range of arm pitch.

BRIEF DESCRIPTION OF THE DRAWINGS

FIG. 1 is a perspective view of a device according to the invention.

FIG. 2 is a front view of the device of FIG. 1 at a first arm pitch.

FIG. 3 is a front view of the device of FIG. 1 at a second arm pitch.

FIG. 4 is a top view of the device of FIG. 1.

FIG. 5 is a front view of a device as in FIG. 2 with alternate chassis.

REFERENCE CHARACTERS

1. Cable
1A. Centerline of cable
2. Cable extension arm
2A. Cable contact on end of cable extension arm
2B. Pivot mount for cable extension arm
2C. Pivot axle of cable extension arm
2D. Pivot axis of cable extension arm
2E. Pitch reference plane
3. Rotary sensor #1
3A. Mounting bracket for sensor #1
3D. Shaft of sensor #1
3X. Data cable of rotary sensor #1
4. Swivel frame
4A. First sheave on swivel frame
4B. Axis of first sheave
4C. Second sheave on swivel frame
4D. Axis of second sheave
4F. Stem of swivel frame
4K. Swivel frame rotation axis
5. Rotary sensor #2
5X. Data cable of rotary sensor #2
6. Take-up drum for cable
6C. Drum case
7. Rotary sensor #3
7X. Data cable of rotary sensor #3
30. Chassis
30'. Alternate chassis
30C. On-board microcomputer and/or data connector interface
30D. On-board display
30K. On-board keyboard
30S. Swivel frame stop

TERMINOLOGY

Cable bend radius—The distance from the axis of a sheave or a spooling drum to the centerline of a cable trained around the sheave or drum. A cable bend circle or arc is a circle or arc defined by the cable bend radius.

DETAILED DESCRIPTION

FIG. 1 illustrates a 3-D position transducer according to aspects of the invention. A chassis 30 supports a swivel frame 4, which in turn supports a pivoting cable extension arm 2, and two sheaves 4A and 4C. The arm 2 has a pivot axis 2D that coincides with the axis 4B of the first sheave 4A. The arm 2 is aligned with a tangent to the cable bend circle in the first sheave 4A. Thus, the arm 2 is aligned with a cable 1 extending from the first sheave 4A. This alignment remains constant over most or all of the range of motion of the cable extension arm 2 due to the coincidence of axes 2D and 4B. This alignment is maintained and the cable 1 remains centered in the arm 2 as long as the cable 1 is in the groove of the first sheave 4A. This allows the arm 2 to be relatively narrow. A tubular form of the arm 2 is suggested, although it is not required. The second sheave 4C is adjacent the first sheave 4A to hold the cable 1 in the groove of first sheave 4A over an extensive pitch range as shown in FIGS. 2-3. This arm range can be over 180 degrees. The position of the second sheave 4C may be chosen according to the arm range needed. For example the second sheave 4C may be directly below the first sheave 4A for a greater pitch range than that illustrated. Measurement of the cable extension is calibrated as a function of pitch angle. A balancing element such as a spring or counterweight may counter the weight of the arm 2 as it pivots away from vertical, so that the arm freely follows the cable direction.

A first sensor 3 is attached to the swivel frame 4 by a mounting bracket 3A, and may have a shaft 3D that serves as a pivot axle 2C for the arm 2, or is otherwise connected to rotate with the arm pivot mount 2B. A second sensor 5 is attached to the chassis 30 to sense the rotational position of the swivel frame 4. The cable 1 may pass through the second sensor 5 as shown. A third sensor 7 is attached to the chassis 30 to sense the rotational position of a cable take-up drum 6. The take-up drum has a cable retraction mechanism (not shown) such as a torsion or clock-form spring or motor that constantly urges the drum 6 to retract the cable by winding it onto the drum. The drum 6 may be a threaded type with grooves holding a single layer of cable windings. The sensors may be designed as known in the art.

FIG. 5 illustrates an alternate chassis 30' with an on-board microcomputer 30C, connected to an on-board display 30D and an on-board keypad 30K. The sensors 3, 5, 7 provide data via respective data cables 3X, 5X, 7X to the on-board microcomputer and/or to a data interface connector. The first sensor 3 rotates on the swivel frame. To accommodate this, the data cable 3X may wrap loosely around the swivel frame stem 4F as shown. A stop 30S may be provided that limits rotation of the swivel frame to about 360 degrees.

The distal end of the cable may have a probe with a hand grip (not shown) for manually touching points on an object to be measured. The microprocessor 30C can be used to compute and accurately calibrate the coordinate positions of the probe tip over its operational range. The display 30D may show coordinates, prompts, and other information, and the keypad 30K allows manual inputs and control. Alternately or additionally, an interface such as RS-232 on the chassis may provide data output from the sensors 3, 5, 7 for input to an external controller or computer. For example, a laptop computer may control operation of the invention, compute and calibrate coordinates, and mathematically model and display the object.

In operation, the cable guide transducer system according to the invention is placed on a stable surface close to an object to be measured. The cable end probe tip is placed on a point on the object, and the sensor data is acquired. In industrial or mechanical applications, this system can monitor the position of moving arms, tools, control surfaces, and the like.

Although the present invention has been described herein with respect to preferred embodiments, it will be understood that the foregoing description is intended to be illustrative, not restrictive. Modifications of the invention will occur to those skilled in the art. All such modifications that fall within the scope of the appended claims are intended to be within the scope and spirit of the present invention.

I claim:

1. A 3-dimensional cable guide, comprising:
    a chassis;
    a cable comprising a centerline;
    a swivel frame rotatably attached to the chassis, the swivel frame comprising a rotation axis;
    first and second sheaves rotatably attached to the swivel frame, each sheave comprising a rotation axis and a circumferential groove, the two sheave axes substantially parallel to each other, and the two sheave grooves substantially adjacent to each other forming a retaining opening between the sheaves for the cable;
    a cable extension arm pivotally attached to the swivel frame on a pivot axis substantially coincident with the first sheave axis, the extension arm having a distal end with a low-friction cable contact surface, a centerline of the extension arm substantially tangent to a cable bend arc of the first sheave;
    a cable take-up drum for spooling the cable; and
    the cable routed from the take-up drum to the opening between the sheaves, then to the distal end of the extension arm, then extending beyond it;
    whereby the cable extends from the take-up drum through the opening between the sheaves to a range of directions, and the extension arm tracks the cable direction by pivoting about the pivot axis and rotating the swivel frame in response to cable pressure on the low-friction cable contact surface.

2. The cable guide of claim 1, further comprising:
    a first rotation sensor operating between the extension arm and the swivel frame for sensing an amount of pivot of the extension arm;
    a second rotation sensor operating between the swivel frame and the chassis for sensing an amount of swivel of the swivel frame; and
    a third rotation sensor operating between the chassis and the take-up drum for sensing the length of the cable extending from the take-up drum.

3. A 3-dimensional cable guide and cable-based position transducer comprising:
    a chassis;
    a cable comprising proximal and distal ends;
    a swivel frame rotatably attached to the chassis, the swivel frame having an axis of rotation;
    first and second sheaves rotatably attached to the swivel frame, each sheave having a rotation axis and a circumferential groove, the two sheave axes substantially parallel to each other, and the two sheave grooves substantially adjacent to each other forming a retaining opening between the sheaves for the cable;
    a cable extension arm pivotally attached to the swivel frame on a pivot axis substantially coincident with the first sheave axis, the extension arm having a distal end with a cable contact surface, the cable extension arm substantially aligned with the cable when the cable spans between the groove of the first sheave and the distal end of the extension arm;
    a cable take-up drum for spooling the cable from the proximal end thereof;
    the cable routed from the drum to the opening between the sheaves, then to the distal end of the extension arm;
    a first rotation sensor on the swivel frame for sensing a pivot of the extension arm;
    a second rotation sensor on the chassis for sensing a swivel of the swivel frame; and
    a third rotation sensor on the chassis for sensing the length of the cable extending from the take-up drum;
    wherein the cable extends from the take-up drum through the opening between the sheaves to a range of directions, the extension arm tracks the cable direction by pivoting about the pivot axis and rotating the swivel frame in response to cable pressure on the cable contact surface, and the sensors provide data for a 3-dimensional coordinate position of the distal end of the cable.

* * * * *